United States Patent
Crawford et al.

(10) Patent No.: US 7,785,402 B2
(45) Date of Patent: Aug. 31, 2010

(54) REMOVABLE VERTICLE MEDIA INSERT SYSTEM FOR AIR TREATMENT

(76) Inventors: Martin J. Crawford, P.O. Box 4859, Stateline, NV (US) 89449; Jeff Jones, 300 Ben Nevis La., Belton, TX (US) 76513

( * ) Notice: Subject to any disclaimer, the term of this patent is extended or adjusted under 35 U.S.C. 154(b) by 127 days.

(21) Appl. No.: 11/800,517

(22) Filed: May 7, 2007

(65) Prior Publication Data
US 2008/0276581 A1   Nov. 13, 2008

(51) Int. Cl.
*B01D 53/04* (2006.01)
(52) U.S. Cl. .............................. 95/274; 96/134; 96/151; 55/516; 55/528; 55/DIG. 42
(58) Field of Classification Search ..................... 95/90, 95/274; 96/108, 134, 135, 138, 151; 55/490, 55/515–517, 528, DIG. 42
See application file for complete search history.

(56) References Cited

U.S. PATENT DOCUMENTS

| | | | | | |
|---|---|---|---|---|---|
| 1,808,170 | A | * | 6/1931 | Kamrath | ...................... 55/315 |
| 1,943,592 | A | * | 1/1934 | Farmer | ...................... 55/385.1 |
| 2,122,582 | A | * | 7/1938 | Norris | ...................... 55/517 |
| 2,185,584 | A | * | 1/1940 | Boyce | ...................... 55/517 |
| 2,557,557 | A | * | 6/1951 | Newcum | ...................... 210/282 |
| 2,771,153 | A | * | 11/1956 | Hennig | ...................... 55/350.1 |
| 3,162,516 | A | * | 12/1964 | Dwyer | ...................... 95/274 |
| 3,747,303 | A | * | 7/1973 | Jordan | ...................... 96/135 |
| 5,092,911 | A | * | 3/1992 | Williams et al. | ............... 95/117 |
| 5,290,457 | A | * | 3/1994 | Karbachsch et al. | ......... 210/792 |
| 2005/0126139 | A1 | * | 6/2005 | Sewell | ...................... 55/512 |

* cited by examiner

*Primary Examiner*—Frank M Lawrence
(74) *Attorney, Agent, or Firm*—William S. Bernheim

(57) ABSTRACT

A support framework for containing a media that is used to remediate corrosive vaporous pollutants in an air stream. The support framework is situated within a plenum and comprises two concentric open-lattice weave frameworks made from corrosion resistant fiberglass reinforced plastic "FRP". The frameworks are of differing diameters and the media is placed into and contained within the open space formed between the inside wall of the outer framework and the outside wall of the inner framework. The open-lattice weave design allows a greater radial flow through the media per unit of time, doing so with less pressure drop and using less energy than the prior art. The use of FRP to form the framework walls allows creation of large units that are suitable for use in municipal and industrial settings, which was not possible previously.

6 Claims, 3 Drawing Sheets

REMOVABLE VERTICLE MEDIA INSERT SYSTEM FOR AIR TREATMENT

BACKGROUND OF THE INVENTION

1. Field of Invention

The invention relates to an apparatus and process for treating air streams to remove pollutants. More particularly it relates to the use of open weave fiberglass reinforced plastic "FRP" to create a media containment framework within a plenum that contains a remediation media which media facilitates interactions which capture pollutants from an air stream being moved horizontally and radially through the media either inwardly or outwardly.

2. Description of the Relevant Prior Art

Vaporous pollutants, which are frequently toxic or corrosive or both, are created in a multiplicity of municipal, commercial and agricultural processes and become part of output airstreams. Treatment of these output airstreams to strip out the pollutants is important to human health, to prevent damage to equipment, to protect the environment and to provide odor control.

Typical treatment of airstreams is to pass the stream through a reactive media in a containment structure within a plenum which serves as a reactor. Issues include plenum size, choice of material and energy consumption. In instances where the air stream contains corrosive gases, the materials used to form the containment structure are chosen to be as non-reactive as practical. This need has traditionally placed a limitation upon the size of media containment structures. Used alone as inert structural materials, plastics do not have the structural strength for creating large structures. Metals have the strength but corrode too easily.

Over time, two differing reactor designs have emerged. The earlier reactors used vertical flow of the air stream under pressure or vacuum, thus requiring a considerable consumption of energy in their operation.

On the other hand, radial flow reactors work at ambient or just above ambient pressures, requiring no compressors or vacuum units or expensive seals for their operation and presenting less potential for escape of untreated air into the environment.

In general, radial air-flow reactors consist of a containment vessel, a plenum, within which is located a series of baffles that separate the incoming polluted air from the exiting purified air. The space between the baffles holds and supports the remediation media. Commonly, the baffles consist of a pair of cylindrically shaped elements, one having a smaller diameter than the other and being concentrically located within the former. These cylinder walls have pore spaces through which the air passes. In an inward flow reactor, the air stream moves from an inlet manifold through the outer baffle into the remediation medium, and then through the inner baffle and into an exit manifold. Or the reactor can be designed to have a reversed flow direction described as an outward flow reactor.

Past radial flow reactor designs suffered from some problems of their own. One of the main problems being that the structural weakness of non-reactive media containment materials prevented the creation of units large enough to efficiently handle large volumes of pollutants. Increasing the bulk of the solid portion of the containment cylinders to make the walls stronger reduced the amount of open air flow space within the cylinder walls, thus decreasing the efficiency of and increasing the cost of operating the unit.

STATEMENT OF THE OBJECTIVES

Accordingly, it is an objective of this invention to provide a corrosion resistant media support system for use in a radial flow reactor, said support system having the structural strength allowing for its use in large commercial and municipal reactors, yet also having a flexibility of design allowing for use in small sized reactors, and at the same time providing media containment support walls with a lower solid to through space ratio that allows for the remediation of a greater volume of air per unit of time relative to other comparably sized units and doing so with a low pressure drop from the inlet side to the outlet side of the media containment structure, thus simplifying installation and conserving energy.

Another object of the invention is to provide a containment structure that is equally suitable for use with a variety of media, including porous granular substrate media such as activated carbon, or media such as foam and reticulated foam.

Another object of this invention is to provide a containment structure design that allows creation of supports that can be retrofitted into existing reactors.

Other objectives, advantages and novel features of the invention will become apparent to those skilled in the art upon examination of the invention and the accompanying drawings.

SUMMARY OF THE INVENTION

The invention involves the creation of two corrosion resistant fiberglass-reinforced plastic FRP frameworks of differing diameters that have been extruded in a woven pattern with approximately a 68% through space ratio; the walls of each of which frameworks comprise a three layered construction that is fused into a unit, the layers being: an external FRP wall, a central corrosion resistant screen material and finally an internal FRP wall that matches the configuration of and is arranged colinear with the open weave pattern of the outer FRP segment of the wall. The frameworks are concentrically situated one within the other within a vertically standing plenum, the space between the two frameworks being designed to hold a medium capable of remediating toxic, corrosive vapors that are carried to it in an air stream that moves through the purification system in a radial flow direction.

BRIEF DESCRIPTION OF THE DRAWINGS

Further objectives and advantages of the invention will be apparent from the following detailed description when taken in conjunction with the accompanying drawings illustrating a preferred embodiment of the invention. The drawings are.

DETAILED DESCRIPTION OF A PREFERRED EMBODIMENT

Figure 2:
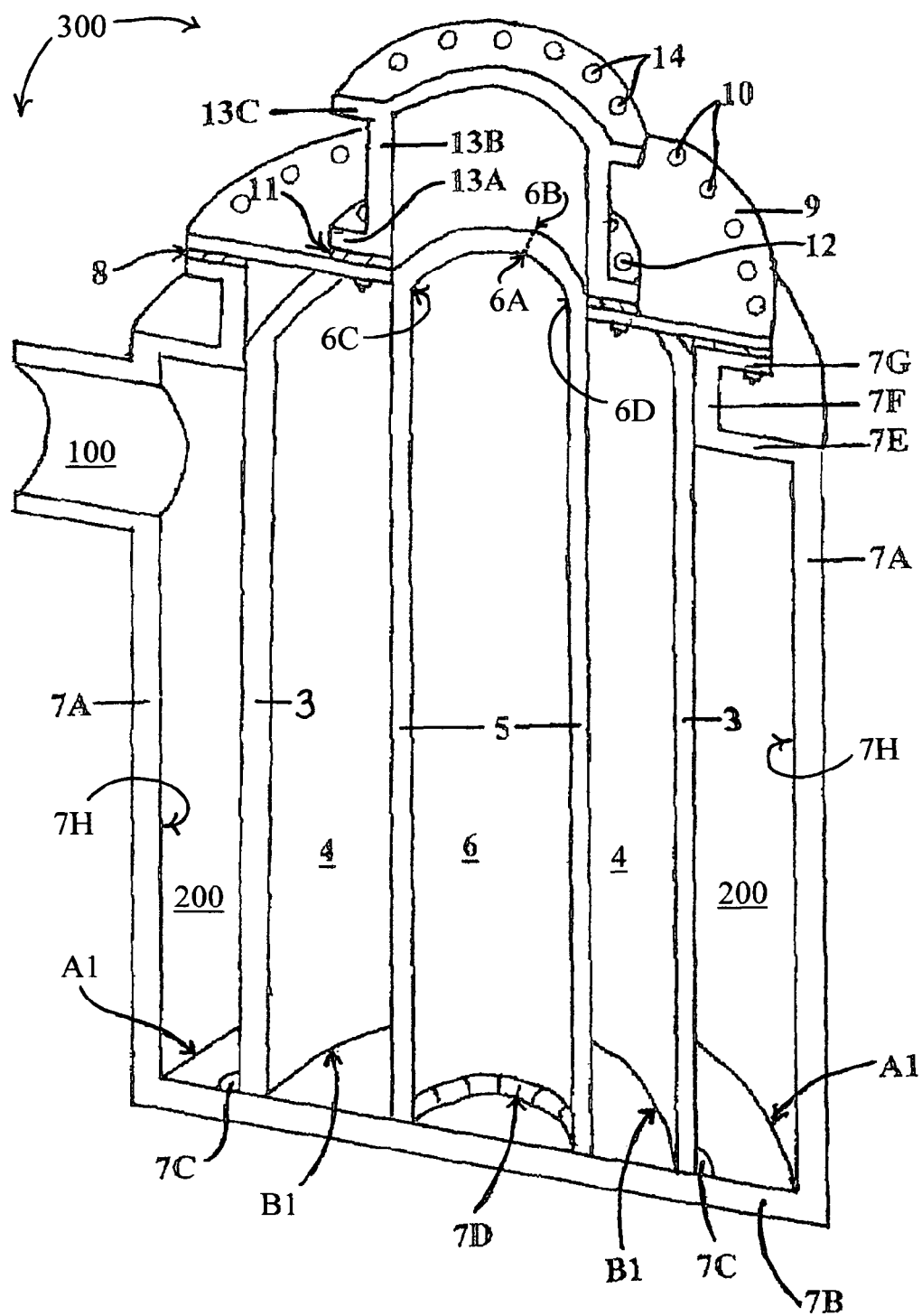
FIG. 2. Presents a perspective view as a vertical cross section at the vertical axis center of a radial-flow air remediation system plenum.

The invention involves the creation of a media containment system comprising in part a pair of media support frameworks 3/5 FIG. 2, said support frameworks each being of a differing diameter, and being situated with a smaller one, a central framework 5 FIG. 2, standing within a larger, a lateral framework 3 FIG. 2; and, said frameworks being in a concentric, coaxial alignment with and standing within a vertically standing radial flow air remediation plenum 300 FIG. 2, serving as a air purification reactor in a use to treat and to purify an air stream containing toxic corrosive or non-corrosive vapors.

Figure 1A:
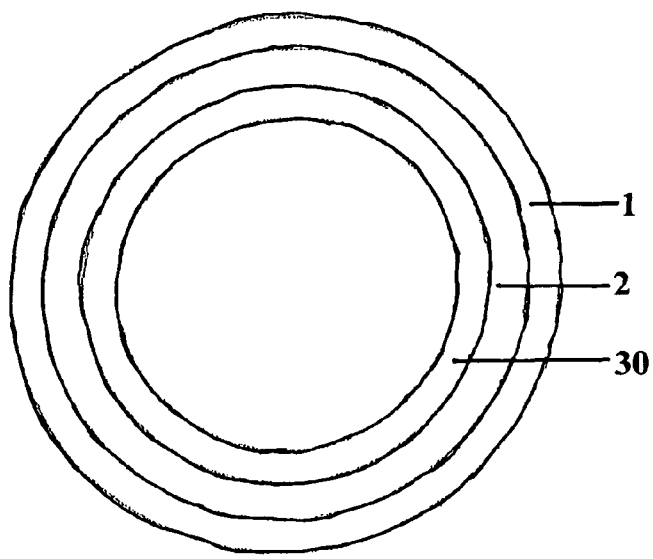
FIG. 1a. Presents a cross sectional view looking down onto the top of a media support cylinder.
Figure 1B:
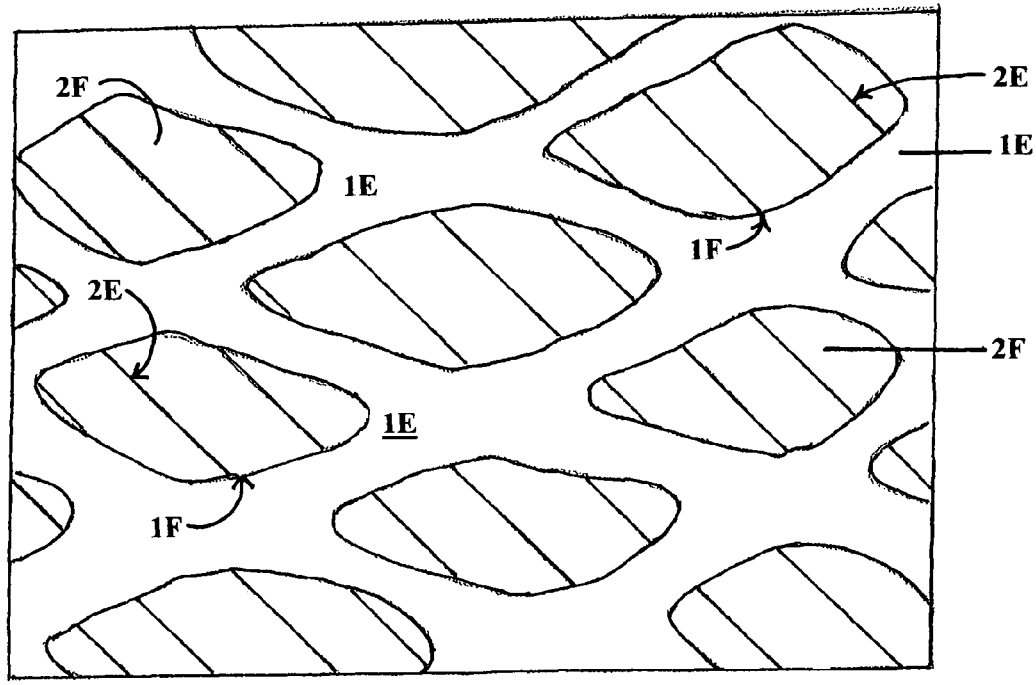
FIG. 1b. Presents a diagrammatic side view of a section of a media support cylinder wall.

Viewed from above in FIG. 1a, said support framework walls 3/5 are each seen to comprise a fused sandwich framework comprising a set of three layers 1,2, 30 FIG. 1A that are fused together into a singular element during their fabrication: an external wall layer 1 FIG. 1A being of a corrosion resistant fiberglass-reinforced plastic "FRP" 1E FIG. 1B, a central screen material layer 2 FIG. 1a being of a woven, corrosion resistant screen material 2E FIG. 2, and an internal wall layer of corrosion resistant Fiberglass Reinforced Plastic 30 FIG. 1A.

Seen in a sectional side view FIG. 1B, said external wall layer is seen to comprise a basket weave diamond shape lattice pattern layer 1E FIG. 1b within which is enclosed a series of openings "through spaces"1F FIG. 1B and within which said openings said woven screen material 2E FIG. 1B is seen; said screen material 2E having a pore size 2F FIG. 1B slightly smaller than a granule size of a unit of a media that is to be contained. The internal wall layer 30 FIG. 1A of the said support framework wall is not visible in FIG. 1B, being of a same design and created to lie in an alignment with the said outer wall layer 1E FIG. 1B but being situated internal to the said screen layer 2 FIG. 1A.

The framework wall elements, when viewed from the side as in FIG. 1B, present as a fused panel in which the central-screen section 2E is a corrosion resistant screen having an approximate pore space to solid material ratio of 50 percent; a pair of superimposed diamond shaped basket weave support framework-wall elements, an internal framework wall element 30 FIG. 1 and an external framework wall element 1 FIG. 1, comprise a solid component being an approximate 32 percent portion, thus presenting with an approximately 68 percent through space of a total framework wall area; said external and internal frameworks being in a full vertical length superimposition, such that, there exists a combined total configuration of a combined framework wall and screen creating an excellent total pore space of approximately 30-34 percent of the support framework's total wall area while creating an exceptional structural strength of the framework walls.

When viewing a perspective view as a vertical cross section at a longitudinal center of said air remediation plenum 300 FIG. 2; a media containment section 4 FIG. 2, is bounded externally by said lateral framework wall 3 and centrally by said central framework wall 5; said media containment section 4 being designed to contain said media capable of remediating said toxic, corrosive or non-corrosive vapors that are carried to it in an air stream, which said air stream is flowing at a ambient or just above ambient air pressure, and that moves through a purification reactor system in a radial flow direction. Said support walls 3 & 5 FIG. 2 are in an alignment coaxially with said vertically standing external wall of said plenum 7A, and provide for a uniform thickness of remediation medium in a radial direction between an inlet-manifold side 200 and an outlet-manifold side 6 FIG. 2 of said plenum over an entire length of said media containment section 4.

A granular organic porous remediation media, held within said frameworks 3 & 5 FIG. 2, commonly activated charcoal, but not limited to being activated charcoal, is commonly of a dimension of 3-4 mm in diameter, but could be larger or smaller dependent upon a need of a particular application.

By presenting a perspective view as a vertical cross section at the vertical axis center of said radial-flow air remediation plenum 300 FIG. 2 as a preferred embodiment, a knowledgeable person can learn one method of aligning and supporting said media support walls that are the foundation of this invention. This example is not intended to represent nor should it be taken to be the sole manner of appropriately aligning and supporting said frameworks, rather, it is presented to educate people familiar with the art as to a method of fabricating a plenum such that there is ease of introduction and removal of said frameworks into said plenum as needed, and such that control of said air stream pathway throughout said plenum presents a minimal possibility of the an escape of an unremediated air stream into the environment while providing for a maximal flow of said airstream from an air inlet 100 FIG. 2 to said outlet manifold side of said plenum with a minimal pressure drop between said inlet and said outlet sides of said radial flow air purification reactor.

Said plenum 300 FIG. 2 that contains said frameworks 3 & 5 FIG. 2 further partially comprises a base section 7ABC-DEFG, and a split-cover top plate 9 that is removable. A contaminated air stream enters said the plenum through said air inlet 100 FIG. 2, and enters an inlet manifold 200, the lateral wall of which said inlet manifold 200 is formed by an inner aspect 7H FIG. 2 of a side wall 7A of said plenum. Said unremediated air then flows horizontally through said lateral support framework wall 3 FIG. 2, then continues radially through said media containment section 4, next passing through said internal most support framework wall 5, and into said outlet manifold 6 after which it exits as a remediated air stream.

In the present embodiment, wherein the frameworks are not removed during a process of media replacement, a base end of said external framework and a base end of said internal framework are not conjoined to a floor 7B FIG. 2 of said plenum nor are they conjoined between themselves; however, for a use within a radial flow remediation plenum designed to allow a removal of said frameworks as a unit for purposes of a replacement of said media, said base ends of said FRP frameworks are conjoined by a fusion to an integral floor section that is separate from said floor of said plenum; forming thus a basket shape comprising said integral floor and said bases of said external and internal cylinder walls. In the present embodiment, a pair of concentric, circular positioning elements, 7C & 7D, FIG. 2 comprising a pair of projections upwards from said floor 7B of said plenum are seen. A lateral framework base positioning element 7C FIG. 2 has an internal diameter slightly larger than that of an external diameter of said lateral support framework wall 3, and serves as a means for a positioning of said base end of that lateral framework and to prevent lateral spread of the base of said framework under a weight of said media particles in said media bed section 4.

A central framework base positioning element 7D FIG. 2 has an external diameter that is slightly smaller than an internal diameter of said central most framework wall 5, and serves as a means for a positioning of said base end of that central framework and to prevent a displacement of the baseof that central framework in towards said outlet manifold 6 under said weight of said media particles located in said media bed section 4.

Said floor 7B FIG. 2 that forms a bottom seal section of said plenum, is appropriately anchored by one of several means to an appropriate foundation section, and at its periphery is joined to the side wall 7A of the plenum, which side wall forms a lateral boundary of the-inlet manifold 2. Above, said side wall 7a FIG. 2 is continuous with a top collar section 7EFG of said plenum's base section 7ABCDEFG. Said collar 7EFG FIG. 2 forms a constriction at the top of said side wall 7A section in which, a basilar projection 7E of said collar section 7EFG is seen as an integral, inward projection at 90.degree to said side wall 7A; a collar throat section 7F is integral with and projects vertically above said basilar projection; said collar throat 7F ends above and is integral with a laterally projecting element, a collar section top flange 7G that serves as a top plate of said base section 7ABCDEFG FIG. 2 of said plenum.

Said basilar projection of said plenum collar section provides: a horizontal projection that forms a top sealing element covering said intake manifold 200; a vertical portion, said collar throat 7F serves as a top guide/support for positioning said external framework 3. Said collar top flange 7G that projects laterally is perforated by a series of holes (not visible) designed to receive a set of bolts/nuts 10 that serve to attach said plenum's base section 7ABCDEFG to said removable split-cover top plate 9. It will be noted that a gasket 8 FIG. 2 is interposed between flange 7G and the removable split-cover top plate 9 section of the plenum and serves to seal the junction of said two parts. A circular, central cutout—curved line—6C-6D FIG. 2 in removable split-cover top plate 9 FIG. 2 serves as a top guide/support for positioning said internal framework 5 and keeps said top of said framework properly aligned such that it forms a peripheral boundary of said exit manifold 6 within said base section 7ABCDEFG of said plenum. Removable split-cover top plate section 9 FIG. 2, has two sets of holes, a peripheral set designed to receive said set of bolts/nuts 10, which said bolt and nut combinations serve to provide an affixation of said plenum base section to said top plate, and a second series surrounding said central cutout that receive a set of bolts/nuts 12, which said bolts/nuts serve to provide an affixation of said top plate to an air outlet base flange 13A FIG. 2 of an air outlet section 13ABC.

At its central termination, said base flange 13A FIG. 2 then turns upwards at 90.degree as an air outlet side wall section 13B which then is continuous with an air outlet top flange section 13C. Said flange section 13C FIG. 2 being pierced by a series of holes 14 to receive bolts—not shown—for attachment to an exit duct—not shown—that carries the remediated air into the environment. A combination of said framework base positioning elements 7C,7D FIG. 2 and said plenum top collar element sections serve to position and support the top and base ends of said lateral and internal frameworks and serve in a manner holding said frameworks at a uniform distance from each other and said plenum wall throughout a full vertical length.

As will be seen in FIG. 4, said removable split-cover top plate 9 is actually formed by a combination of a pair of mirror image sections.

Cover section collar 13ABC FIG. 2 is formed of an inferior, horizontally aligned flange 13A through which the bolts 12 pass in order to attach said collar to top section 9. At its central termination, flange 13A FIG. 2 then turns upwards at 90.degree as section 13B which then is continuous with the 90.degree laterally projecting flange section 13C. Said flange section 13C FIG. 2 being pierced by holes 14 to receive bolts—not shown—for attachment to an exit duct—not shown—that carries the remediated air into the environment.

An internally projecting curvature A1 FIG. 2 of said side wall 7a of said plenum is seen. An internally projecting curvature B1 FIG. 2 of said lateral FRP support framework wall 3 is seen. A top cross section of said central most support framework wall 5 FIG. 2 is seen as a distance between arrow tips 6A and 6B FIG. 2.

Figure 3:
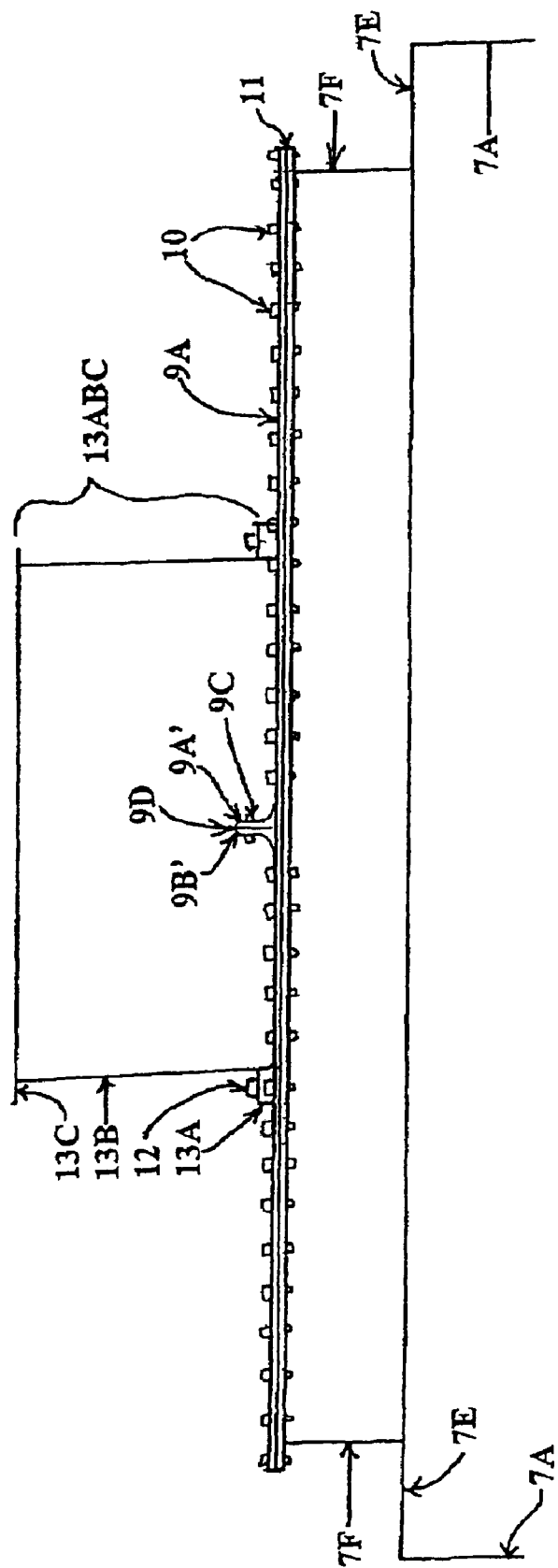
FIG. 3. Presents a lateral view of the inter-connected attachment of the removable split-cover top plate sections of the plenum's top cover as well as the relationship of the removable split-cover top plate section to the base section of the plenum.

Greater detail of a connection of and sealing of said base section 7ABCDEFG FIG. 2 to a top section 9-13C FIG. 2 of said plenum is presented in FIG. 3.

FIG. 4 presents a diagrammatic lateral view showing a pair of top plate connecting flanges 9A, 9B FIG. 3 of the removable top plate-sections 9 FIG. 3. The bases of said split-cover top plate connecting flanges 9A, 9B FIG. 3 are welded to said removable split-cover top plate sections 9 FIG. 3 across their widths, and where said cover plate connecting flanges 9A,9B come together they are interconnected by a series of bolt and nut sets 9C FIG. 3—only one of which is visible. Also seen is a vertically situated gasket 9D FIG. 3 that serves as a sealing element that seals a junction between said connecting flanges 9A,9B FIG. 4.

Said bolts 10 FIG. 3 serve to connect the two halves of said top plate 9 to said top flange section 7G of the base section collar 7EFG. Said gasket 11 is seen situated between said split-cover top plate 9 FIG. 3 and collar section top flange 7G of base section collar 7EFG. The relative position of the above described elements to said walls of said base section of said plenum is best seen in FIG. 2 as a portion 7AEFG FIG. 3 of said plenum 300.

An outlet section 13 A,B and C FIG. 3 has been included in order to spatially indicate the relationship of said outlet section to said removable split-cover top plate 9, an internal diameter of which forms the continuation of said outlet manifold above the level of said removable split-cover top plate 9 as is shown in FIG. 2.

The great strength and design flexibility created by this invention allows of a creation of frameworks for a use in a containment of said media, said frameworks being of a variety of sizes for plenums ranging from a very small size to a very large commercial/industrial size radial flow unit.

Current production has created units ranging from said small units in which the support frameworks were 4 feet tall, having a central framework internal diameter of 6 inches with the external framework diameter being 3 feet; up to a very large unit, 20 feet tall with a central FRP framework diameter of 7 feet and an external FRP framework diameter of 11 feet. With respect to said larger construction mentioned above, it is a specific combination of FRP materials and said diamond shape basket weave wall configuration design elements created in this invention that allows of a creation of media containment systems suitable for service in large scale industrial and commercial purification projects, such as were not possible utilizing the prior art.

What is claimed is:

1. An improvement in a media containment system for a containment of a media used in a purification of a contaminated air stream within a vertically standing air stream remediation plenum;

said improvement allowing of a creation of a variety of sizes of media containment systems ranging from a small to a very large commercial size unit, and, allowing of a greater flow of said air stream through said plenum per unit of time, and, doing so with a less pressure drop from an inlet side to an outlet sided of said plenum, and using a less amount of energy than was possible in the prior art;

said media containment system improvement comprising in part, a pair of media support frameworks, each of said frameworks comprising a sandwich of a set of three layers of material that are fused together into a singular element;

a. an external layer comprised of a corrosion resistant Fiberglass Reinforced Plastic which said external layer is created in a form of a basket weave diamond shaped lattice pattern having an approximately 68 percent of a through space area between bands of Fiberglass Reinforced Plastic material, b. a central layer comprising a corrosion resistant plastic screen material having a pore size comprising a pore space to solid ratio of approximately 50 percent of a total surface area of said screen with said pores being of a slightly smaller size than a granule size of a media it is to be used to contain, and, c. an internal layer comprised of a corrosion resistant Fiberglass Reinforced Plastic; which said internal layer is created in a form of an open-weave diamond shaped lattice pattern having an approximately 68 percent through space area between said bands of Fiberglass Reinforced Plastic material;

said basket weave diamond shaped pattern of said internal layer being of a creation in same design and in an alignment with said basket weave diamond shaped pattern of said outer Fiberglass Reinforced Plastic layer throughout a full vertical length of said framework wall, said framework being formed in a variety of sizes for a use in a containment of said media being used in said purification of said contaminated air stream;

said contaminated air stream comprising an air stream containing corrosive vapors.

2. The media support wall of claim 1 in which said open pore space of said screen material in a combination with said framework through space comprises an approximately 34 percent portion of a total surface area of said support framework wall area.

3. The vertically standing air stream remediation plenum of claim 1 in which said plenum further comprises an air inlet, an air inlet manifold, an air outlet, a floor, a collar section and a sidewall; and which said plenum is formed having a base section, and a removable split cover top plate section, and within which said plenum are situated said pair of media support wall frameworks, a lateral framework and a central framework, which said frameworks are of a different diameter with a smaller central framework situated within a larger lateral framework; said frameworks, being in an alignment within and vertically coaxial with said sidewall of said base section of said plenum, thus forming, between themselves, a media containment section allowing of a uniform thickness of said remediation media in a radial direction between said inlet manifold and an outlet manifold of said plenum;

and in which said frameworks present with an overall through space to solid surface ratio having a range between 25 percent and 45 percent for allowing a radial flow of said contaminated air stream from said inlet manifold, through said lateral support framework wall, into and through said remediation media, then through said central most support framework wall, and finally into said outlet manifold for a discharge from said plenum;

said media support frameworks' walls being held at a uniform distance from each other and said plenum wall throughout a full vertical length by their situation into a pair of framework positioning elements located in said floor of said plenum as well as by their situation above, respectively, within a circular cutout in said top plate of said plenum for said internal framework, and a collar throat section of said plenum for said external framework.

4. The media support frameworks of claim 1 wherein said Fiberglass Reinforced Plastic frameworks are designed to provide said media containment for a granular organic porous media.

5. The media support frameworks of claim 4 wherein said central layer screen has a pore size slightly smaller than a 3-4 mm granule size of said media.

6. A process for a purification of a contaminated air stream:

a. by moving said contaminated air stream, at an ambient or slightly above ambient air pressure, into an inlet manifold of a vertically standing, radial flow air remediation plenum then in a radial direction through a media comprising a granular porous media;

b. contacting said air stream with said media contained within a pair of concentrically arranged media support frameworks of differing diameters, said frameworks each having a basket weave diamond shaped lattice pattern wall, and said walls comprising a fused sandwich formed from a single layer of corrosion resistant plastic screening situated between an internal layer and an external layer of a Fiberglass Reinforced Plastic material; a total through space of said combined screen and said Fiberglass Reinforced Plastic wall materials comprising an approximately 34 percent portion of a total surface area of said framework walls;

c. after passing through which said frameworks and said media said air stream passes into an outlet manifold;

d. and thence exits from said plenum as a remediated air stream.

* * * * *